(12) United States Patent
Roberts

(10) Patent No.: US 6,931,533 B2
(45) Date of Patent: Aug. 16, 2005

(54) REMOVABLE HARDWARE DEVICE AUTHENTICATION SYSTEM AND METHOD

(75) Inventor: David Keir Roberts, Ottawa (CA)

(73) Assignee: Mitel Knowledge Corporation, Kanata (CA)

( * ) Notice: Subject to any disclaimer, the term of this patent is extended or adjusted under 35 U.S.C. 154(b) by 888 days.

(21) Appl. No.: 09/826,554

(22) Filed: Apr. 4, 2001

(65) Prior Publication Data

US 2001/0056534 A1 Dec. 27, 2001

(30) Foreign Application Priority Data

Apr. 18, 2000 (GB) ............................................. 0009618

(51) Int. Cl.$^7$ ................................................. G06F 7/58
(52) U.S. Cl. ....................... 713/168; 708/250; 379/198
(58) Field of Search ................................ 713/168, 200; 708/250; 379/198

(56) References Cited

U.S. PATENT DOCUMENTS

| | | | |
|---|---|---|---|
| 4,206,920 A | | 6/1980 | Weatherford et al. |
| 4,723,284 A | | 2/1988 | Munck et al. |
| 4,766,516 A | | 8/1988 | Ozdemir et al. |
| 4,799,635 A | | 1/1989 | Nakagawa |
| 5,070,479 A | * | 12/1991 | Nakagawa ............ 714/11 |
| 5,325,201 A | * | 6/1994 | Herz ..................... 348/571 |
| 5,426,763 A | | 6/1995 | Okada |
| 5,643,086 A | * | 7/1997 | Alcorn et al. ............ 463/29 |
| 5,935,002 A | | 8/1999 | Falciglia |
| 6,134,684 A | | 10/2000 | Baumgartner et al. |

FOREIGN PATENT DOCUMENTS

| | | |
|---|---|---|
| CA | 2159360 | 1/1995 |
| CA | 2138829 | 8/1995 |
| CA | 2219344 | 4/1998 |
| EP | 0234100 A2 | 8/1987 |
| GB | 2270182 A | 3/1994 |
| WO | WO 97/23986 | 7/1997 |

* cited by examiner

Primary Examiner—Andrew Caldwell
Assistant Examiner—Jeffrey Popham
(74) Attorney, Agent, or Firm—Beyer Weaver & Thomas, LLP

(57) ABSTRACT

A hardware authentication system and method for equipment including at least one removable hardware component comprising a processing unit within the equipment that includes a first pseudo-random number generator responsive to at least one non-deterministic event for generating a pseudo-random number. A second pseudo-random number generator is provided on the removable hardware component. The second pseudo-random number generator is also responsive to the at least one non-deterministic event and generates a pseudo-random number. The processing unit compares the pseudo-random numbers generated by the first and second pseudo-random number generators to detect coincidence and thereby determine authenticity of the hardware component.

19 Claims, 1 Drawing Sheet

REMOVABLE HARDWARE DEVICE AUTHENTICATION SYSTEM AND METHOD

FIELD OF THE INVENTION

The present invention relates generally to component authentication and in particular to a hardware authentication system and method.

BACKGROUND OF THE INVENTION

It is common practice in many industries to design equipment including modular hardware components. This allows hardware components to be replaced or exchanged with ease without requiring overall equipment modification. In many areas, equipment suppliers have found copying of their hardware components to be a problem. It has been found that unauthentic components sometimes do not meet the equipment suppliers' quality standards and/or do not interface properly with the equipment. Customers experiencing difficulty with unauthentic components often attribute the negative experiences to the equipment suppliers. This has led equipment manufacturers to incorporate authentication mechanisms into their equipment to inhibit unauthorized copies of hardware components from being used in their equipment.

For example, U.S. Pat. No. 4,723,284 to Monk et al discloses a hardware authentication system for a public key communications network. The public key network includes at least one user terminal and at least one hardware authentication terminal coupled to the user terminal. The authentication terminal generates and stores a plain text message therein. The authentication terminal also generates from the plain text message, a cipher text message by transforming the plain text message with the public key of the user terminal and transmits the cipher text message to the user terminal. The user terminal is adapted to receive the cipher text message and transform the cipher text message with its private key to obtain a plain text message. The user terminal also transmits the plain text message back to the authentication terminal. The authentication terminal compares the plain text message received from the user terminal with the plain text message stored therein to determine coincidence. If the two plain text messages match, the authentication terminal generates an authentic user signal indicating that the user terminal is the hardware terminal associated with the public key.

U.S. Pat. No. 4,799,635 to Nakagawa discloses a system for determining the authenticity of computer software stored in a ROM cartridge when used with a main processor unit. To verify that the ROM cartridge is authentic, duplicate semiconductor devices are included in the ROM cartridge and the main processor unit. The semiconductor device associated with the ROM cartridge acts as a key device and the semiconductor device in the main processing unit acts as a lock device. The key and lock devices are synchronized and execute the same arithmetic operation according to pre-programming. The results of the executed arithmetic operations are exchanged between the semiconductor devices and compared. If the results agree, the ROM cartridge is determined to be authentic and the main processing unit is allowed to operate. If the ROM cartridge is determined to be unauthentic, the main processing unit is continuously reset inhibiting it from operating.

U.S. Pat. No. 4,766,516 to Ozdemir et al discloses a security system and method for protecting an integrated circuit from unauthorized copying. During design the integrated circuit is provided with at least one additional circuit element that does not contribute towards the function of the integrated circuit. Rather, the additional circuit element is designed to inhibit operation of the integrated circuit when an unauthorized copy of the integrated circuit is made. The additional circuit element has the visible appearance of being functionally interconnected to the integrated circuit but actually is not. Thus, in an authentic device, the additional circuit element is isolated from the integrated circuit. However, when a copy is made, if the copier copies the integrated circuit according to its visual appearance, the additional circuit element will be physically connected to the integrated circuit and the operation of the additional circuit element will inhibit proper operation of the integrated circuit.

Although the above-identified references disclose systems and methods to deter copying, new authentication systems and methods are of course desired. It is therefore an object of the present invention to provide a novel hardware authentication system and method.

SUMMARY OF THE INVENTION

According to one aspect of the present invention there is provided a hardware authentication system for equipment including at least one removable hardware component comprising:

a processing unit within said equipment and including a first pseudo-random number generator responsive to at least one non-deterministic event for generating a pseudo-random number; and a second pseudo-random number generator on said removable hardware component, said second pseudo-random number generator also being responsive to said at least one non-deterministic event and generating a pseudo-random number, said processing unit comparing the pseudo-random numbers generated by said first and second pseudo-random number generators to detect coincidence and thereby determine authenticity of said hardware component.

In a preferred embodiment, the first and second pseudo-random number generators are responsive to non-deterministic and periodic events. Each of the pseudo-random number generators includes a counter that increments its count in response to non-deterministic events; a register that rotates its contents in response to periodic events; and logic coupling the counter and the register and modifying the register contents using the value of the counter prior to rotation of the contents of the register.

It is also preferred that the equipment is a private branch exchange and the removable component is a line card. In this case, the non-deterministic event is a busy state of a circuit of the line card resulting due to an off-hook condition of a telephone set connected to the circuit.

According to another aspect of the present invention there is provided a method of authenticating a removable hardware component installed in equipment, said method comprising the steps of:

providing a first pseudo-random number generator in said equipment that is responsive to at least one non-deterministic event for generating a pseudo-random number;

providing a second pseudo-random number generator on said hardware component that is also responsive to said at least one non-deterministic event for generating a pseudo-random number;

comparing the pseudo-random numbers generated by the first and second pseudo-random number generators at intervals to detect coincidence and thereby determine authenticity of said hardware component.

The present invention provides advantages in that unauthorized hardware components installed in equipment can be detected and inhibited from operating properly when used in the equipment. Since the first and second pseudo-random number generators generate pseudo-random numbers in response to variable events that occur within the equipment, the pseudo-random numbers generated by the pseudo-random number generators are difficult to predict making it extremely difficult for unauthentic hardware components to subvert the authentication system. Since authentic components are compatible with the equipment, quality standards and component compatibility can be ensured.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

The present invention relates to a hardware authentication system and method to determine the authenticity of a replaceable hardware component installed within equipment. In the preferred embodiment, the replaceable hardware component includes a pseudo-random number generator that is responsive to non-deterministic and periodic events and generates pseudo-random numbers. A processing unit in the equipment executes a software version of the same pseudo-random number generator and compares the numbers it generates with the pseudo-random numbers generated by the pseudo-random number generator in the hardware component, at selected intervals. If the numbers match, the hardware component is considered to be authentic. If the numbers do not match, the hardware component is considered to be unauthentic and its operation within the equipment is inhibited. A preferred embodiment of the present invention will now be described with reference to FIGS. 1 and 2.

Figure 1:
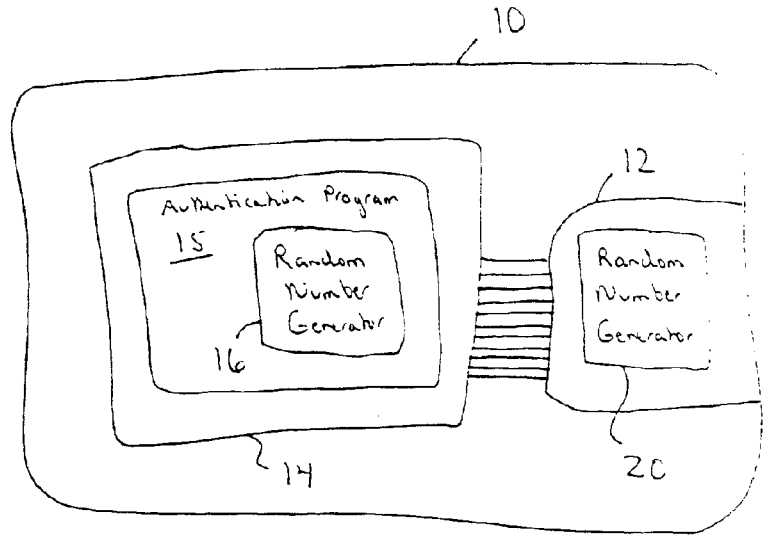
FIG. 1 is a schematic diagram of equipment incorporating a hardware authentication system in accordance with the present invention.

Turning now to FIG. 1, equipment 10 including a replaceable hardware component 12 is shown. The hardware component 12 is releasably connected to the equipment 10 to facilitate replacement. The equipment 10 has a processing unit 14 executing an authentication program 15 including a software-based pseudo-random number generator 16. The replaceable hardware component 12 also includes a pseudo-random number generator 20. The authentication program 15 and the pseudo-random number generator 20 constitute a hardware authentication system designed to determine the authenticity of the hardware component 12 installed in the equipment 10.

Figure 2:
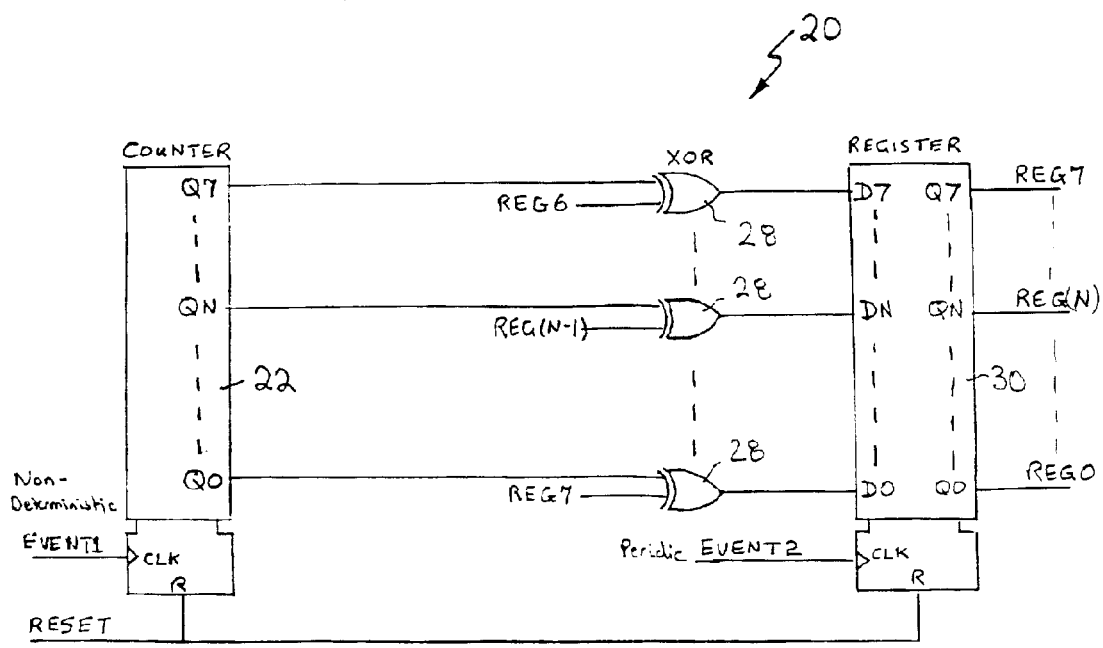
FIG. 2 is a schematic diagram of a pseudo-random number generator incorporated within a replaceable hardware component and forming part of the hardware authentication system of FIG. 1.

As can be seen in FIG. 2, the pseudo-random number generator 20 includes an 8-bit counter 22 having a plurality of parallel output pins $Q_0$ to $Q_7$, a clock pin CLK and a reset pin R. The clock pin CLK receives input in response to the occurrence of a non-deterministic event. The output pins of the counter 22 are coupled to an array of XOR gates 28. The output pins of the XOR gates 28 lead to respective input pins $D_0$ to $D_7$ of an 8-bit register 30. The register 30 also includes a plurality of output pins $Q_0$ to $Q_7$, a clock pin CLK and a reset pin R. The pseudo-random number generated by the pseudo-random number generator 20 is held by the register 30 and can be read via its output pins $Q_0$ to $Q_7$. Each output pin of the register 30 is also coupled to an input pin of a respective XOR gate 28. The clock pin CLK receives input at periodic intervals.

Preferably, the counter 22, the register 30, the XOR gates 28 and the address decoding for the clock pins of the counter and register are contained within a single physical device, such as for example an ASIC or programmable logic device. In this way, generation of pseudo-random numbers by the pseudo-random number generator 20 cannot be easily observed or derived.

Similar to pseudo-random number generator 20, software pseudo-random number generator 16 includes a software counter, a software register and software logic for performing XOR operations on the software register contents using the count values output by the software counter. The pseudo-random number generator 20 is also responsive to the non-deterministic and periodic events.

In the preferred embodiment, the removable hardware component 12 is a twelve (12) circuit line card for a private branch exchange (PBX) 10. The non-deterministic event used to increment the counter 22 is any one of the line card circuits entering the busy state. This non-deterministic event occurs whenever a telephone set connected to a line card circuit enters an off-hook state.

The periodic input used to rotate the register is generated by the authentication program 15 every hour. The hardware component authentication process will now be described with particular reference to FIG. 2.

Initially the counter 22 and register 30 as well as the software counter and register are reset by the authentication program 15. During normal operation, whenever a telephone set connected to one of the line card circuits enters an off-hook state, an input signal is applied to the clock pin CLK of the counter 22 causing the counter to increment its count value. The incremented count value output by the counter 22 is conveyed to the XOR gates 28, which also receive the register contents. The outputs of the XOR gates 28 are applied to the input pins $D_0$ to $D_7$ of the register 30 thereby to modify the register contents. Every hour, the authentication program 15 generates a signal that is applied to the clock pin CLK of register 30 causing the register to rotate the value therein by one bit position.

The software pseudo-random number generator 16 executed by the processing unit 14 is also responsive to the non-deterministic and periodic events and generates the same pseudo-random numbers.

Each hour after the register contents have been rotated, the authentication program 15 executed by the processing unit 14 reads the contents of the register 30 and the software register and compares the pseudo-random numbers. If the numbers match, the line card 12 is considered to be authentic and operation of the line card 12 within the PBX 10 continues. If however the numbers do not match, the authentication program 15 generates a flag causing the processing unit 14 to inhibit further operation of the line card 12 within the PBX 10.

As will be appreciated, the hardware authentication system periodically checks the authenticity of replaceable hardware components within the equipment and inhibits an unauthentic hardware component from being used. Since the pseudo-random numbers generated by the software pseudo-random number generator and the hardware pseudo-random number generator are based on non-deterministic events, generation of the pseudo-random numbers cannot be easily observed or derived.

Although the pseudo-random number generator 20 shows all of the bits of the counter 22 and register 30 being XORed, the XORing operation can be performed only on selected bits if desired. Also, although the contents of the register 30 are described as being rotated by one bit on each periodic signal, the register contents can of course be rotated by more than one bit position on each periodic signal or not at all. Alternatively, more than one periodic signal may be required in order to rotate the register contents by one bit. In this case, additional logic is required to rotate the register contents every $n^{th}$ periodic signal. Furthermore, if desired the counter 22 and/or register 30 can be preset with values at the time the pseudo-random number generator 20 in the hardware component 12 is initialized. The values can be preset or can be read from a variable source such as for example a real time clock. Also, if desired, the length of the counter 22 and register 30 can be increased or decreased. If the pseudo-random number generator 20 is modified in one or more of the above described manners, those of skill in the art will recognize that the software-based pseudo-random number generator 16 is of course modified in the same manner.

Although the hardware pseudo-random number generator is described as including a binary counter, a register and an array of XOR gates, the counter, register and XOR functions may be embodied in a microprocessor having appropriate firmware.

As will be appreciated, since authentic hardware components are compatible with the equipment, replaceable component integrity and quality standards can be maintained at the desired level.

Although a preferred embodiment of the present invention has been described, those of skill in the art will appreciate that variations and modifications may be made without departing from the spirit and scope thereof as defined by the appended claims.

I claim:

1. A hardware authentication system for a private branch exchange including at least one removable hardware line card comprising:
   a processing unit within said private branch exchange and including a first pseudo-random number generator responsive to at least one non-deterministic event for generating a pseudo-random number, said at least one non-deterministic event being an operating state of said removable hardware line card; and
   a second pseudo-random number generator on said removable hardware line card, said second pseudo-random number generator also being responsive to said at least one non-deterministic event and generating a pseudo-random number, said processing unit comparing the pseudo-random numbers generated by said first and second pseudo-random number generators to detect coincidence and thereby determine authenticity of said removable hardware line card.

2. A hardware authentication system according to claim 1 wherein said pseudo-random number generators are responsive to non-deterministic and periodic events.

3. A hardware authentication system according to claim 2, wherein each of said pseudo-random number generators includes:
   a counter incrementing its count value in response to non-deterministic events;
   a register rotating its contents in response to periodic events; and
   logic coupling the counter and the register, said logic receiving the count value output by said counter and modifying said register contents using the value of said counter, the value held by said register constituting said pseudo-random number.

4. A hardware authentication system according to claim 3 wherein said logic performs an XOR operation on the register value using the value of said counter.

5. A hardware authentication system according to claim 4 wherein the XOR operation is performed on each bit of the resister value.

6. A hardware authentication system according to claim 4 wherein the XOR operation is performed on selected bits of the register value.

7. A hardware authentication system according to claim 3 wherein said first pseudo-random number generator is realized by software executed by said processing unit and wherein said second pseudo-random number generator is realized in a single physical device within said removable hardware line card.

8. A hardware authentication system according to claim 7 wherein said single physical device is an ASIC or a programmable logic device.

9. A hardware authentication system according to claim 7 wherein said at least one non-deterministic event is a busy state of a circuit of said removable hardware line card resulting due to an off-hook condition of a telephone set connected to said circuit.

10. A hardware authentication system according to claim 3 wherein said processing unit compares the pseudo-random numbers at periodic intervals.

11. A hardware authentication system according to claim 10 wherein said processing unit compares the pseudo-random numbers following each periodic event.

12. A hardware authentication system according to claim 11 wherein said at least one non-deterministic event is a busy state of a circuit of said removable hardware line card resulting due to an off-hook condition of a telephone set connected to said circuit.

13. A hardware authentication system according to claim 10 wherein said at least one non-deterministic event is a busy state of a circuit of said removable hardware line card resulting due to an off-hook condition of a telephone set connected to said circuit.

14. A hardware authentication system according to claim 3 wherein said at least one non-deterministic event is a busy state of a circuit of said removable hardware line card resulting due to an off-hook condition of a telephone set connected to said circuit.

15. A hardware authentication system according to claim 2 wherein said at least one non-deterministic event is a busy state of a circuit of said removable hardware line card resulting due to an off-hook condition of a telephone set connected to said circuit.

16. A hardware authentication system according to claim 1 wherein said at least one non-deterministic event is a busy state of a circuit of said removable hardware line card resulting due to an off-hook condition of a telephone set connected to said circuit.

17. A method of authenticating a removable hardware line card installed in a private branch exchange, said method comprising the steps of:
   providing a first pseudo-random number generator in said private branch exchange that is responsive to at least one non-deterministic event for generating a pseudo-random number, said at least one non-deterministic event being an operating state of said removable hardware line card;

providing a second pseudo-random number generator in said removable hardware line card that is also responsive to said at least one non-deterministic event for generating a pseudo-random number; and comparing the pseudo-random numbers generated by the first and second pseudo-random number generators at intervals to detect coincidence and thereby determine authenticity of said removable hardware line card.

18. The method of claim 17 wherein generation of each pseudo-random number includes the steps of:

incrementing a count value in response to non-deterministic events;

rotating a register value constituting the pseudo-random number in response to periodic events; and modifying the register value using the count value prior to rotation of the register value.

19. The method of claim 18 wherein the modifying step includes the step of XORing the register value using the count value.

* * * * *